United States Patent
Yu et al.

(10) Patent No.: US 8,430,575 B2
(45) Date of Patent: Apr. 30, 2013

(54) OPTICAL FIBER CONNECTOR AND OPTICAL FIBER COUPLING ASSEMBLY HAVING SAME

(75) Inventors: Tai-Cherng Yu, New Taipei (TW); Kun-Chan Wu, New Taipei (TW); Chia-Ling Hsu, New Taipei (TW); Yi-Zhong Sheu, New Taipei (TW); I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/082,404

(22) Filed: Apr. 8, 2011

(65) Prior Publication Data
US 2012/0155809 A1 Jun. 21, 2012

(30) Foreign Application Priority Data
Dec. 16, 2010 (TW) ................................ 99144117 A

(51) Int. Cl.
*G02B 6/00* (2006.01)
*G02B 6/36* (2006.01)
*G02B 6/38* (2006.01)

(52) U.S. Cl.
USPC .......................................................... 385/74

(58) Field of Classification Search ............... 385/74–77, 385/88–90, 147, 24, 31, 33, 34, 60, 80; 250/216, 250/227
See application file for complete search history.

(56) References Cited

U.S. PATENT DOCUMENTS

| | | | |
|---|---|---|---|
| 7,235,774 B2 * | 6/2007 | Ishigami et al. | 250/216 |
| RE41,147 E * | 2/2010 | Pang et al. | 398/139 |
| 7,850,373 B2 * | 12/2010 | Ishigami et al. | 385/92 |
| 2002/0028048 A1 * | 3/2002 | Dair et al. | 385/92 |
| 2011/0164851 A1 * | 7/2011 | Ishigami | 385/93 |
| 2011/0249171 A1 * | 10/2011 | Shigemitsu et al. | 348/340 |

* cited by examiner

*Primary Examiner* — Akm Enayet Ullah
(74) *Attorney, Agent, or Firm* — Altis Law Group, Inc.

(57) ABSTRACT

An optical fiber connector includes a connector body and a lens block. The connector body defines a number of blind holes and a receiving room. The blind holes opens towards a first side of the connector body. The receiving room opens towards an opposing second side of the connector body The lens block includes a body portion and a number of protruding portions extending from a first side of the body portion. The lens block is received in the receiving room. The protruding portions are positioned between the body portion and the blind holes. The protruding portions are aligned with the respective blind holes. The body portion has a flat second side face free of protruding portions thereon, at an opposite side thereof to the protruding portions.

12 Claims, 4 Drawing Sheets

OPTICAL FIBER CONNECTOR AND OPTICAL FIBER COUPLING ASSEMBLY HAVING SAME

BACKGROUND

1. Technical Field

The present disclosure relates to optics and, particularly, to an optical fiber connector and an optical fiber coupling assembly having such optical fiber connector.

2. Description of Related Art

An optical fiber coupling assembly is preferred for use in data transmission between electronic devices due to its high transmission speed and signal integrity. Generally, the optical fiber coupling assembly includes two optical fiber connectors, coupling optical fibers together to allow optical transmittance between the optical fibers. The optical fiber connectors include lenses aligned with corresponding optical fibers. When coupling the optical fiber connectors together, a lens in a first optical fiber connector aligns with a corresponding lens in a second optical fiber connector to ensure the optical transmittance. However, when the optical fiber coupling assembly is in use or transported, the lenses are easily broken and contaminated as the lenses are exposed to the external environment. This decreases transmission efficiency and degrades signal integrity.

Therefore, it is desirable to provide an optical fiber connector and an optical fiber coupling assembly using the same, which can overcome or at least alleviate the limitations described.

DETAILED DESCRIPTION

Figure 1:
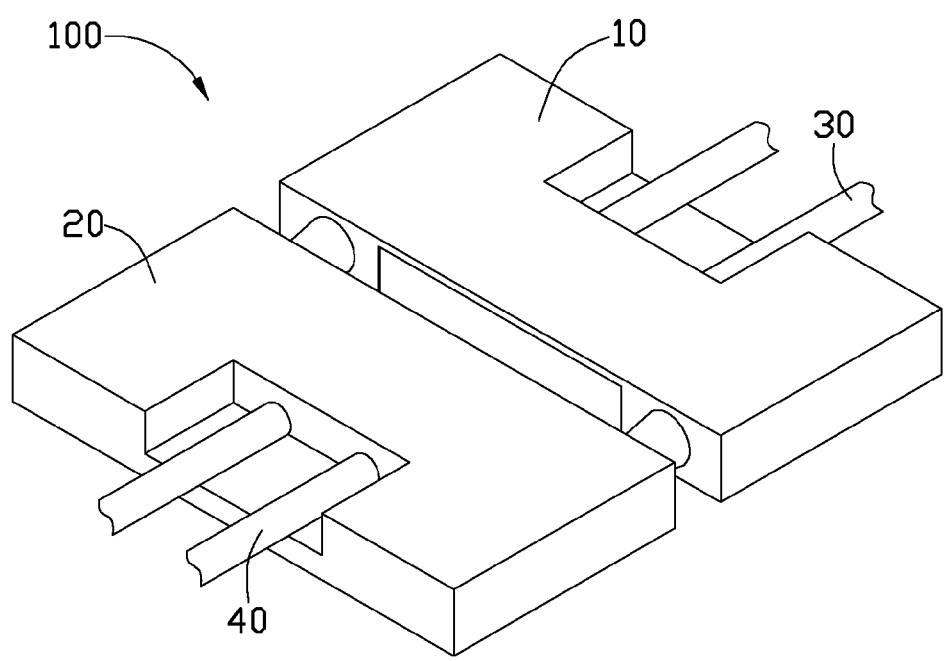
FIG. 1 is a schematic, isometric view of an optical fiber coupling assembly, according to an exemplary embodiment.

Referring to FIG. 1, an optical fiber coupling assembly 100, according to an exemplary embodiment, includes a first optical fiber connector 10 and a second optical fiber connector 20. The first optical fiber connector 10 couples with the second optical fiber connector 20 to allow optical transmittance.

Figure 2:
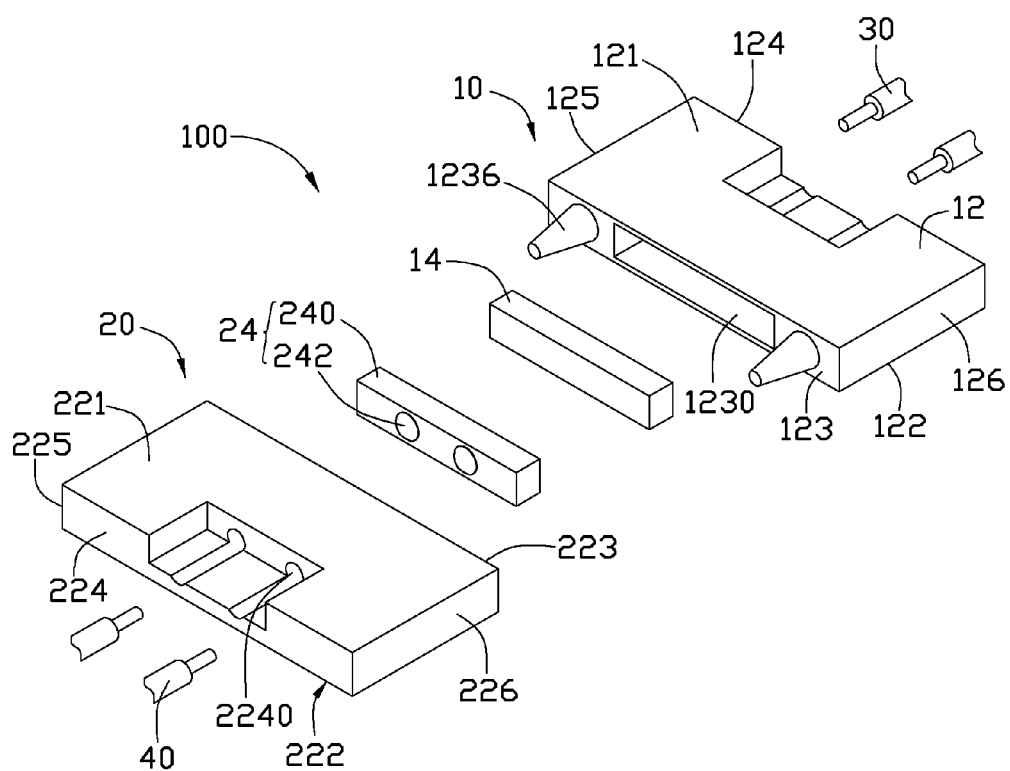
FIG. 2 is an exploded view of the optical fiber coupling assembly of FIG. 1.
Figure 3:
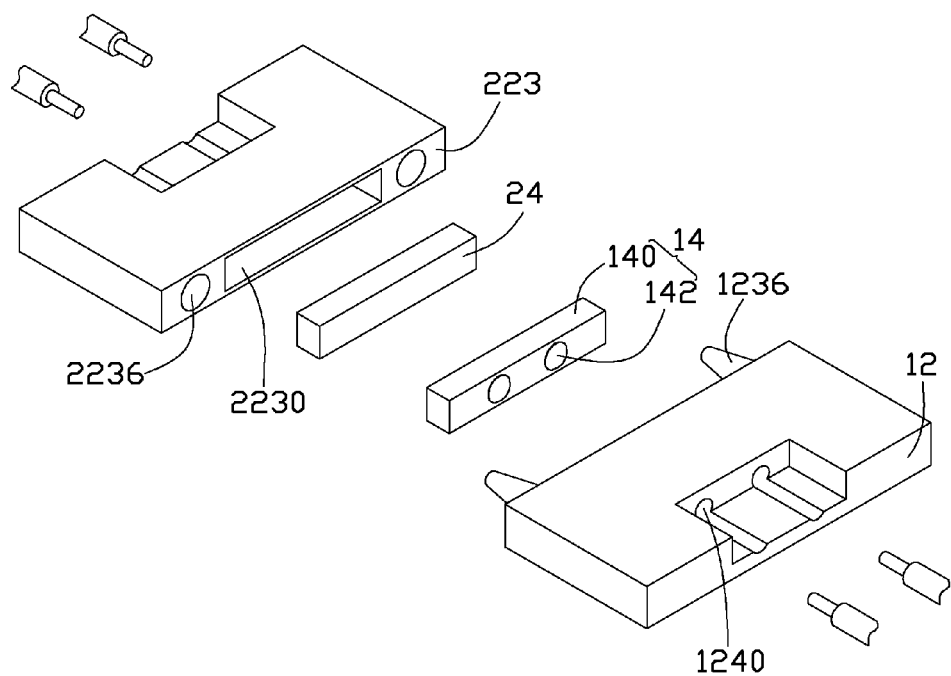
FIG. 3 is similar to FIG. 2, but viewed from another angle.
Figure 4:
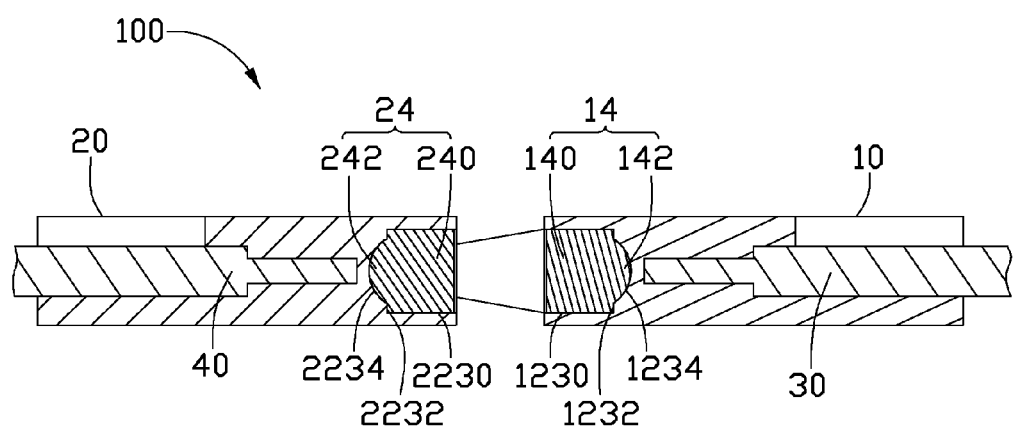
FIG. 4 is a section view of the optical fiber coupling assembly of FIG. 1.

Referring to FIGS. 2-4, the first optical fiber connector 10 includes a first body 12, a first lens block 14, and two first optical fibers 30.

The first body 12 is substantially a transparent cube. The first body 12 includes an upper face 121, a lower face 122, a first sidewall 123, a second sidewall 124, a third sidewall 125, and a fourth sidewall 126. The upper face 121 is substantially parallel to the lower face 122. The first sidewall 123 is substantially parallel to the second sidewall 124. The third sidewall 125 is substantially parallel to the fourth sidewall 126. The first sidewall 123, the third sidewall 125, the second sidewall 124, and the fourth sidewall 126 are connected end-to-end to each other. The first sidewall 123, the second sidewall 124, the third sidewall 125, and the fourth sidewall 126 connect the upper face 121 to the lower face 122.

Two first blind holes 1240 are defined in the first body 12 through the second sidewall 124. A first receiving groove 1230 is defined in a central portion of the first sidewall 123. Two first recesses 1234 are defined in a bottom 1232 of the first receiving groove 1230. The first recesses 1234 are aligned with the first blind holes 1240, respectively. The first receiving groove 1230 and the two first recesses 1234 cooperatively constitute a first receiving room. The first lens block 14 is received in the first receiving room. Two plugs 1236 extend from two sides of the first sidewall 123. In this embodiment, the first receiving groove 1230 is cube-shaped.

The first lens block 14 includes a first body portion 140 and two first protruding portions 142. The first body portion 140 is substantially a cube conforming to the first receiving groove 1230. The first protruding portions 142 extend from a side of the first body portion 140 and conform to the first recesses 1234, respectively. Each first protruding portion 142 includes an aspheric surface. In this embodiment, the first body portion 140 is fittingly secured in the first receiving groove 1230 with adhesive, and the first protruding portions 142 are matingly received in the respective first recesses 1234. In this embodiment, the first lens block 14 is a unitary piece and has a flat side face free of protruding portions 142 thereon, at an opposite side thereof to the first protruding portions 142.

The first optical fibers 30 are received in the respective first blind holes 1240 to align with the respective first protruding portions 142.

The second optical fiber connector 20 includes a second body 22, a second lens block 24, and two second optical fibers 40.

The second body 22 is substantially a transparent cube. The second body 22 includes an upper surface 221, a lower surface 222, a first side surface 223, a second side surface 224, a third side surface 225, and a fourth side surface 226. The upper surface 221 is parallel to the lower surface 222. The first side surface 223 is parallel to the second side surface 224. The third side surface 225 is parallel to the fourth side surface 226. The first side surface 223, the third side surface 225, the second side surface 224, and the fourth side surface 226 are connected end-to-end to each other. The first side surface 223, the third side surface 225, the second side surface 224, and the fourth side surface 226 connect the upper surface 221 to the lower surface 222.

Two second blind holes 2240 are defined in the second body 22 through the second side surface 224. A second receiving groove 2230 is defined in a central portion of the first side surface 223. Two second recesses 2234 are defined in a bottom 2232 of the second receiving groove 2230. The second recesses 2234 are aligned with the second blind holes 2240, respectively. The second receiving groove 2230 and the two second recesses 2234 cooperatively constitute a second receiving room. The second lens block 14 is received in the second receiving room. Two engagement holes 2236 are defined in two sides of the first side surface 223 corresponding to the two plugs 1236. In this embodiment, the second receiving groove 2230 is cube-shaped.

The second lens block 24 includes a second body portion 240 and two second protruding portions 242. The second body portion 240 is substantially a cube conforming to the second receiving groove 2230. The second protruding portions 242 extend from a side of the second body portion 240 and conform to the second recesses 2234, respectively. Each second protruding portion 242 includes an aspheric surface. In this embodiment, the second body portion 240 is fittingly secured in the second receiving groove 2230 with adhesive, and the second protruding portions 242 are matingly received in the respective second recesses 2234. In this embodiment, the second lens block is a unitary piece and has a flat side face free of protruding portions 242 thereon, at an opposite side thereof to the second protruding portions 242, facing toward the first lens block 14. The flat side face of the second lens block 24 is substantially parallel to the flat side face of the first lens block 14.

The second optical fibers 40 are received in the respective second blind holes 2240 to align with the respective second protruding portions 242.

In assembly, the first body portion 140 is fittingly secured in the first receiving groove 1230, and the first protruding portions 142 are matingly received in the respective first recesses 1234. The second body portion 240 is fittingly secured in the second receiving groove 2230, and the second protruding portions 242 are matingly received in the respective second recesses 2234. Therefore, the lens blocks 14 and 24 are not easily broken and contaminated as the first and second protruding portions 142, 242 are not exposed to an external environment. This increases transmission efficiency and ensures the signal integrity.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An optical fiber coupling assembly comprising:
    a first optical fiber connector comprising:
        a first body defining a plurality of first blind holes and a first receiving room facing the first blind holes;
        a first lens block comprising a first body portion and a plurality of first protruding portions extending from a side face of the first body portion, the first lens block received in the first receiving room, the first protruding portions positioned between the first body portion and the first blind holes, the first protruding portions aligned with the respective first blind holes; and
    a second optical fiber connector comprising:
        a second body mechanically coupled to the first body, the second body defining a plurality of second blind holes and a second receiving room facing the second blind holes;
        a second lens block comprising a second body portion and a plurality of second protruding portions extending from a side face of the second body portion, the second lens block received in the second receiving room, the second protruding portions positioned between the second body portion and the second blind holes, the second protruding portions aligned with the respective second blind holes, the second protruding portions optically coupled to the respective first protruding portions.

2. The optical fiber coupling assembly as claimed in claim 1, wherein the first lens block is a unitary piece comprising a flat side face free of protruding portions thereon, at an opposite side thereof to the first protruding portions, facing toward the second lens block.

3. The optical fiber coupling assembly as claimed in claim 2, wherein the second lens block is a unitary piece comprising a flat side face free of protruding portions thereon, at an opposite side thereof to the second protruding portions, facing toward the first lens block.

4. The optical fiber coupling assembly as claimed in claim 3, wherein the flat side face of the second lens block is substantially parallel to the flat side face of the first lens block.

5. The optical fiber coupling assembly as claimed in claim 1, wherein the first body comprises a first receiving groove fittingly receiving the first body portion of the first lens block, and a plurality of first recesses matingly receiving the first protruding portions, the first receiving groove and the first recesses cooperatively constituting the first receiving room.

6. The optical fiber coupling assembly as claimed in claim 1, wherein the second body comprises a second receiving groove fittingly receiving the second body portion of the second lens block, and a plurality of second recesses matingly receiving the second protruding portions, the second receiving groove and the second recesses cooperatively constituting the second receiving room.

7. The optical fiber coupling assembly as claimed in claim 1, wherein each of the first protruding portions and the second protruding portions comprises an aspheric surface.

8. The optical fiber coupling assembly as claimed in claim 1, wherein two plugs extend from the first sidewall, two engagement holes are defined in the first side surface receiving the corresponding plugs.

9. The optical fiber coupling assembly as claimed in claim 1, wherein the first lens block is secured in the first receiving room with adhesive, the second lens block is secured in the second receiving room with adhesive.

10. An optical fiber connector comprising:
    a connector body defining a plurality of blind holes opening toward a first side thereof and a receiving room opening toward an opposing second side thereof;
    a lens block comprising a body portion and a plurality of protruding portions extending from a first side face of the body portion, the lens block received in the receiving room, the protruding portions positioned between the body portion and the blind holes, the protruding portions aligned with the respective blind holes, the body portion having a flat second side face free of protruding portions thereon, at an opposite side thereof to the protruding portions.

11. The optical fiber connector as claimed in claim 10, wherein the connector body comprises a receiving groove fittingly receiving the body portion of the lens block, and a plurality of recesses matingly receiving the protruding portions, the receiving groove and the recesses cooperatively constituting the receiving room.

12. The optical fiber connector as claimed in claim 10, wherein each of the protruding portions comprises an aspheric surface.

* * * * *